United States Patent
Tsukijima

(10) Patent No.: US 10,254,685 B2
(45) Date of Patent: Apr. 9, 2019

(54) BELT CONVEYANCE DEVICE AND IMAGE FORMING APPARATUS

(71) Applicant: CANON KABUSHIKI KAISHA, Tokyo (JP)

(72) Inventor: Hisashi Tsukijima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/901,179

(22) Filed: Feb. 21, 2018

(65) Prior Publication Data
US 2018/0181032 A1    Jun. 28, 2018

Related U.S. Application Data

(63) Continuation of application No. PCT/JP2016/072729, filed on Aug. 3, 2016.

(30) Foreign Application Priority Data

Aug. 31, 2015 (JP) ................. 2015-171564

(51) Int. Cl.
*G03G 15/20*  (2006.01)
*G03G 15/16*  (2006.01)
*B65G 15/28*  (2006.01)
*B65G 39/16*  (2006.01)
*G03G 21/16*  (2006.01)

(52) U.S. Cl.
CPC ......... *G03G 15/1615* (2013.01); *B65G 15/28* (2013.01); *B65G 39/16* (2013.01); *G03G 15/167* (2013.01); *G03G 21/1647* (2013.01)

(58) Field of Classification Search
CPC .......... G03G 15/0131; G03G 15/1605; G03G 15/1615; G03G 15/167; G03G 21/1647; B65G 15/28; B65G 39/16
See application file for complete search history.

(56) References Cited

U.S. PATENT DOCUMENTS

| 7,920,814 B2 | 4/2011 | Atwood et al. |
| 8,238,793 B2 | 8/2012 | Nakura et al. |

(Continued)

FOREIGN PATENT DOCUMENTS

| JP | 2000-264479 A | 9/2000 |
| JP | 2002-002999 A | 1/2002 |

(Continued)

OTHER PUBLICATIONS

International Search Report and Written Opinion dated Nov. 1, 2016, in International Application No. PCT/JP2016/072729.

(Continued)

*Primary Examiner* — Hoang X Ngo
(74) *Attorney, Agent, or Firm* — Venable LLP

(57) ABSTRACT

A belt conveyance device has a configuration where one end of a rotation shaft of an inclinable steering roller that can move an endless belt in the width direction is supported by a first support member that is pivotable on a first pivot axis extending in a first axial line direction intersecting the rotation axis of the steering roller, and the other end of the rotation shaft of the steering roller is supported by a second support member that is pivotable on a second pivot axis that is generally parallel with the rotation axis of another suspending roller and also extends in a direction generally orthogonal to the first axial line.

13 Claims, 17 Drawing Sheets

(56) References Cited

U.S. PATENT DOCUMENTS

| | | | |
|---|---|---|---|
| 8,326,181 B2 | 12/2012 | Nakagawa | |
| 8,577,261 B2 | 11/2013 | Nakura et al. | |
| 2010/0189475 A1* | 7/2010 | Atwood | G03G 15/0131 |
| | | | 399/302 |
| 2012/0213559 A1* | 8/2012 | Krucinski | G03G 15/1615 |
| | | | 399/302 |
| 2015/0078792 A1* | 3/2015 | Aoyagi | G03G 15/1615 |
| | | | 399/302 |

FOREIGN PATENT DOCUMENTS

| | | |
|---|---|---|
| JP | 2007-163695 A | 6/2007 |
| JP | 2009-145765 A | 7/2009 |
| JP | 2010-176125 A | 8/2010 |
| JP | 2010-223981 A | 10/2010 |
| JP | 2012-108219 A | 6/2012 |

OTHER PUBLICATIONS

U.S. Appl. No. 15/928,502, filed Mar. 22, 2018, Hisashi Tsukijima Simpei Hanayama.

* cited by examiner

FIG. 9

| No. | STATE | BELT POSITION | SENSOR OUTPUT (○: TRANSMITTING, ●: SHIELDED) | | | | |
|---|---|---|---|---|---|---|---|
| | | | 280a | 280b | 280c | 280d | 280e |
| 0 | ERROR | 4.7 OR MORE | ○ | ○ | ○ | ○ | ○ |
| 1 | BACK MAX | 3.6 TO 4.7 | ○ | ○ | ○ | ○ | ● |
| 2 | BACK LARGE | 2.4 TO 3.6 | ○ | ○ | ○ | ● | ● |
| 3 | BACK MID | 1.2 TO 2.4 | ○ | ○ | ● | ● | ● |
| 4 | BACK SMALL | 0.0 TO 1.2 | ○ | ● | ● | ● | ● |
| 5 | FRONT SMALL | −1.2 TO 0 | ● | ● | ● | ● | ○ |
| 6 | FRONT MID | −2.4 TO −1.2 | ● | ● | ● | ○ | ○ |
| 7 | FRONT LARGE | −3.6 TO −2.4 | ● | ● | ○ | ○ | ○ |
| 8 | FRONT MAX | −4.7 TO −3.6 | ● | ○ | ○ | ○ | ○ |
| 9 | ERROR | LESS THAN −4.7 | ● | ○ | ○ | ○ | ○ |

BELT CONVEYANCE DEVICE AND IMAGE FORMING APPARATUS

CROSS-REFERENCE TO RELATED APPLICATIONS

This application is a Continuation of International Patent Application No. PCT/JP2016/072729, filed Aug. 3, 2016, which claims the benefit of Japanese Patent Application No. 2015-171564, filed Aug. 31, 2015, both of which are hereby incorporated by reference herein in their entirety.

TECHNICAL FIELD

The present invention relates to a belt conveyance device used in an image forming apparatus such as a photocopier, printer, facsimile apparatus or the like, using electrophotographic or electrostatic printing, and to the image forming apparatus having the same.

BACKGROUND ART

Heretofore, image forming apparatuses using electrophotography or electrostatic printing use a belt conveyance device having an endless belt (hereinafter also referred to simply as "belt") suspended around multiple suspending rollers. The belt is used as a conveyance member that bears and conveys toner images, bears and conveys recording material on which a toner image is formed, and so forth. Types of conveyance members that bear and convey toner images include a belt-shaped electrophotographic photosensitive member (photosensitive belt), an intermediate transfer member (intermediate transfer belt) that bears and conveys a toner image transferred from a photosensitive member for transfer onto recording material, and so forth. Types of conveyance members that bear and convey recording material on which a toner image is formed include a recording material bearing member (conveyance belt) that bears and conveys recording material onto which a toner image is transferred from a photosensitive member, and so forth.

An example of an electrophotographic image forming apparatus having an intermediate transfer belt will be further described. A general problem with an intermediate transfer belt suspended around multiple suspending rollers and rotationally driven (conveyed) is "belt deviation" where the belt is deviated to one end side or the other in the width direction when being driven. This belt deviation occurs due to outer diameter precision of the suspending rollers, alignment precision among the suspending rollers, and so forth.

One measure to deal with this belt deviation is a method called "active steering", where at least one suspending roller is inclined as to another suspending roller, thereby moving the intermediate transfer belt in the opposite direction as to the displacement of the intermediate transfer belt in the width direction.

Japanese Patent Laid-Open Nos. 2010-223981 and 2002-2999 describe a configuration where a frame supporting a steering roller can be inclined as to a frame supporting another suspending roller, and one end of the frame supporting the steering roller is raised/lowered along an edge of the frame supporting another suspending roller.

Japanese Patent Laid-Open No. 2000-264479 describes a configuration where one end of a rotation shaft of a steering roller is supported by a steering arm that is capable of rocking, and the other end is supported by a fixed arm, with the one end of the rotation shaft of the steering roller being raised/lowered by the steering arm.

However, the configuration where the frame supporting the steering roller is raised/lowered along the edge of the other frame, as described in Japanese Patent Laid-Open Nos. 2010-223981 and 2002-2999, readily exhibits positional deviation of the steering roller in a direction generally orthogonal to the steering direction, due to looseness and wear at a guide portion. Also, in the configuration described in Japanese Patent Laid-Open Nos. 2010-223981 and 2002-2999, the greater the distance from the center of rotation of the steering roller to a slide face between the frames is, the more readily the frame is inclined with the support point as the point of origin, due to tension of the intermediate transfer belt, and the weight of the steering roller itself. Accordingly, the steering roller is prone to sagging greatly. As a result, even in a state where the steering roller should be maintained in parallel to another suspending roller, the position of the one end of the steering roller easily deviates, leading to misalignment with the other suspending roller, and belt deviation readily occurs.

In comparison, the configuration where the ends of the rotation shaft of the steering roller are supported as described in Japanese Patent Laid-Open No. 2000-264479 is advantageous with regard to the point of misalignment of the steering roller described above. However, the configuration described in Japanese Patent Laid-Open No. 2000-264479 involves twisting the fixing arm when inclining the steering roller. Accordingly, the center of twisting of the fixing arm is the actual center of inclination of the steering roller. In this case, the position of the center of inclination will differ depending on the shape of the fixing arm, and it is difficult to set the center of inclination of the steering roller at a desired position. Consequently, the perceived amount of positional deviation, where the position of the edge portion of the intermediate transfer belt is perceived to move in the width direction without moving over the steering roller, due to inclination of the intermediate transfer belt along with the inclination of the steering roller, increases. In a configuration where a sensor that detects the position of the intermediate transfer belt in the width direction inclines along with the steering roller, this results in positional deviation of the intermediate transfer belt that is not detected by the sensor. In a configuration where the sensor is not inclined along with the steering roller, the perceived positional deviation is added to the amount of positional deviation due to belt deviation and output, which is undesirable in performing highly-precise positional control of the intermediate transfer belt.

Although description has been made above by way of an example of an intermediate transfer belt, the same problem can occur in any belt conveyance device having a steering mechanism such as described above.

SUMMARY OF INVENTION

It has been found desirable to provide a belt conveyance device and an image forming apparatus that facilitates setting of a center of inclination of a steering roller to a predetermined position, and inclining the steering roller following a set predetermined inclination path.

A belt conveyance device according to an aspect of the present invention includes: an endless belt; a plurality of suspending rollers configured to suspend the belt, the plurality of suspending rollers including an inclinable steering roller configured to move the belt in a width direction; a first frame configured to rotatably support at least one suspending roller of the plurality of suspending rollers other than the steering roller; a second frame configured to rotatably support the steering roller, the second frame including a first support portion configured to rotatably support a first end of a rotation shaft of the steering roller, a second support portion configured to pivotably support a second end of the rotation shaft of the steering roller at the opposite side from the first end, and a linking portion configured to link the first support portion and the second support portion; a support unit that is attached to the second frame at the first end side with regard to the rotation axis direction of the steering roller, and is configured to pivotably support the first support portion on a first rotation axis that intersects the rotation axis of the steering roller; and a rocking support plate that is attached to the second frame at the second end side with regard to the rotation axis direction of the steering roller, pivotably on a second pivot axis that intersects the first rotation axis, and can rock the second end of the rotation shaft of the steering roller.

According to another aspect of the present invention, an image forming apparatus is provided that has the above-described belt conveyance device according to the present invention, and a toner image forming unit that forms toner images on the belt, or on recording material borne by the belt.

Further features of the present invention will become apparent from the following description of exemplary embodiments with reference to the attached drawings.

BRIEF DESCRIPTION OF DRAWINGS

FIG. 9 is a diagram illustrating the correlation between belt positions and combinations of sensor output signals.

DESCRIPTION OF EMBODIMENTS

A belt conveyance device and image forming apparatus according to the present invention will be described below in detail with reference to the drawings.

First Embodiment

1. Overall Configuration and Operations of Image Forming Apparatus.

Figure 1:
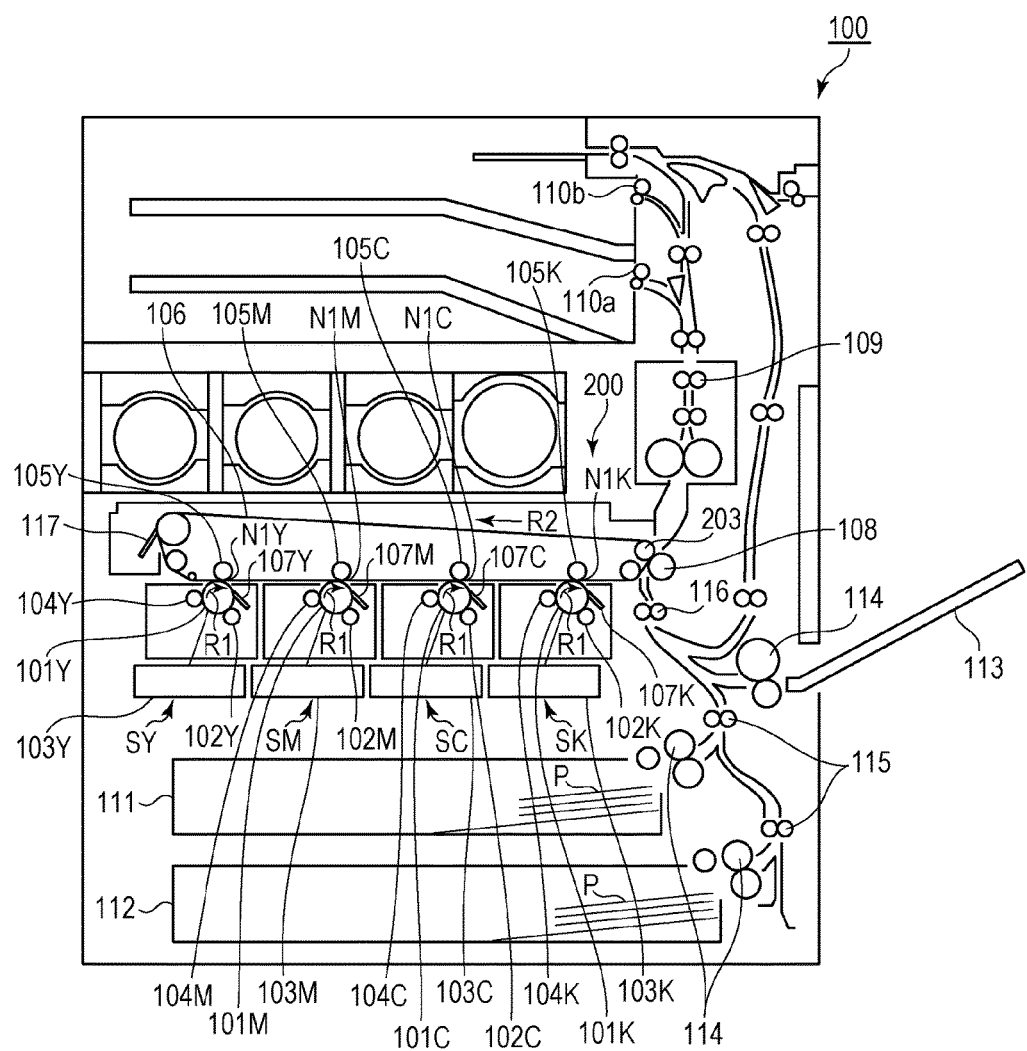
FIG. 1 is a schematic cross-sectional view of an image forming apparatus.

FIG. 1 is a schematic cross-sectional view of the image forming apparatus according to an embodiment of the present invention. The image forming apparatus 100 according to the present embodiment is a tandem type color digital printer that uses an intermediate transfer system, and is capable of forming color images by electrophotography.

The image forming apparatus 100 has first, second, third, and fourth image forming units SY, SM, SC, and SK as multiple image forming units (stations) that form yellow (Y), magenta (M), cyan (C), and black (K) images, respectively. The basic configurations and operations of the image forming units SY, SM, SC, and SK are essentially the same except that the colors of the toners used in the developing process differ in the present embodiment. Accordingly, if there is no particular need to distinguish between these, the Y, M, C, and K for the end of the reference symbols to indicate the color of the component will be omitted, and the components will be described collectively.

The image forming unit S has a photosensitive drum 101 that is a drum-shaped electrophotographic photosensitive member (photosensitive member) serving as an image bearing member. The photosensitive drum 101 is rotationally driven in the direction of the arrow R1 in FIG. 1. The following devices are disposed in the vicinity of the photosensitive drum 101 in the image forming unit S: a charging roller 102 that is a roller-shaped charging member serving as a charging unit, a laser scanner 103 serving as an exposing unit, a developing device 104 serving as a developing unit, a primary transfer roller 105 that is a roller-shaped primary transfer member serving as a primary transfer unit, and a drum cleaner 107 serving as a photosensitive member cleaning unit.

The surface of the rotating photosensitive drum 101 is generally uniformly charged by the charging roller 102 to a predetermined potential of a predetermined polarity (negative polarity in the present embodiment). The surface of the photosensitive drum 101 that has been charged is exposed by the laser scanner 103 according to image signals, and an electrostatic latent image (electrostatic image) according to the image signals is formed on the photosensitive drum 101. Image signals corresponding to each image forming unit S are input to the laser scanner 103, the surface of the photosensitive drum 101 is irradiated by laser beam in accordance with the image signals, and the charge on the photosensitive drum 101 is neutralized, forming an electrostatic latent image. The electrostatic latent image formed on the photosensitive drum 101 is developed by the developing unit 104, by toner serving as a developing agent. In the present embodiment, toner charged to the same polarity as the charging polarity of the photosensitive drum 101 (negative polarity in the present embodiment) adheres to exposed portions on the photosensitive drum 101 where the absolute value of potential has fallen due to having been exposed after being uniformly charged (reverse developing).

The image forming apparatus 100 has an intermediate transfer belt 106 configured as an endless belt serving as an intermediate transfer medium, facing each photosensitive drum 101 of the image forming units S. The intermediate transfer belt 106 is rotationally driven in the direction of arrow R2 in FIG. 1. The above-described primary transfer rollers 105 are disposed on the inner peripheral face side of the intermediate transfer belt 106, opposing the photosensitive drums 101 of the respective image forming units S. The primary transfer rollers 105 are biased (pressed) toward the photosensitive drum 101 across the intermediate transfer belt 106, thereby forming primary transfer portions (primary transfer nips) N1 where the intermediate transfer belt 106 and the photosensitive drums 101 come into contact. At the outer peripheral face side of the intermediate transfer belt 106, a secondary transfer roller 108 that is a roller-shaped secondary transfer member serving as a secondary transfer unit is disposed opposing a secondary transfer opposed roller 203, which is one of the multiple suspending rollers over which the intermediate transfer belt 106 is suspended. The secondary transfer roller 108 is biased (pressed) toward the secondary transfer opposed roller 203 across the intermediate transfer belt 106, thereby forming a secondary transfer portion (secondary transfer nip) N2 where the intermediate transfer belt 106 and the secondary transfer roller 108 come into contact. Note that the primary transfer rollers 105, the intermediate transfer belt 106, the multiple suspending rollers over which the intermediate transfer belt 106 is suspended, and so forth, make up an intermediate transfer unit 200 serving as a belt conveyance device according to the present embodiment. The intermediate transfer unit 200 will be described later in further detail.

The toner images formed on the photosensitive drums 101 are electrostatically transferred (primary transfer) onto the rotating intermediate transfer belt 106 at the primary transfer portions N1 by the operation of the primary transfer roller 105. Primary transfer bias that is of the opposite polarity from the charging polarity of the toner when charging (regular charging polarity) is applied to the primary transfer roller 105. For example, in the later-described forming of a full-color image, the toner images of the respective colors formed on the photosensitive drums 101 of the image forming units S are transferred onto the intermediate transfer belt 106 at the primary transfer portions N1 so as to be sequentially overlaid. Accordingly, a composite toner image for the full-color image is formed on the intermediate transfer belt 106. Toner remaining on the photosensitive drum 101 after the primary transfer process (primary transfer residual toner) is removed from the surface of the photosensitive drum 101 by the drum cleaner 107 and recovered.

On the other hand, recording material (transfer material, recording media, sheets) P such as paper or the like fed out from one of cassettes 111 and 112 and a manual feed tray 113, are sent to a registration roller 116 by a feed roller 114, conveyance rollers 115, and so forth. After the leading edge of the recording material P abuts the stopped registration roller 116 and a loop is formed, rotation of the registration roller 116 is started in synch with the toner image on the intermediate transfer belt 106, and the recording material P is conveyed to the secondary transfer portion N2.

At the secondary transfer portion N2, the toner image on the intermediate transfer belt 106 is electrostatically transferred (secondary transfer) onto the recording material P by the operations of the secondary transfer roller 108. At this time, secondary transfer bias of opposite polarity to the regular charging polarity of the toner is applied to the secondary transfer roller 108. Toner remaining on the intermediate transfer belt 106 after the secondary transfer process (secondary transfer residual toner) is removed from the intermediate transfer belt 106 by a belt cleaner 117 serving as an intermediate transfer member cleaning unit, and recovered.

The recording material P onto which the toner image has been transferred is sent to a fixing device 109 serving as a fixing unit, and a toner image is fixed onto the recording material P by heat and pressure here. Thereafter, the recording material P is externally discharged from the apparatus, from one or the other of discharge portions 110a and 110b. The image forming units SY, SM, SC, and SK make up the toner image forming unit that forms toner images on the intermediate transfer belt 106 in the present embodiment.

2. Intermediate Transfer Unit

Next, a general configuration of the intermediate transfer unit 200 serving as the belt conveyance device in the present embodiment will be described. Note that the direction generally orthogonal to the direction of movement of the intermediate transfer belt 106 (conveyance direction), i.e., the width direction, will be referred to as "thrust direction". This thrust direction is generally parallel with the rotation axis direction of the photosensitive drum 101 and suspending rollers 201 through 205.

Further, with regard to the image forming apparatus 100, the near side of the thrust direction in the plane of the drawing in FIG. 1 will be referred to as the "front side", and the far side in the plane of the drawing will be referred to as the "back side". Also note that while the up/down directions with regard to the image forming apparatus 100 means the up/down directions with regard to the vertical direction, this does not only mean directly above or directly below, and includes being upwards or downwards as to a reference position or component as compared to being at a horizontal position therewith. The layout relationship of positions and components of the image forming apparatus 100 is the layout relationship when the image forming apparatus 100 is in a position of normal use.

Figure 2:
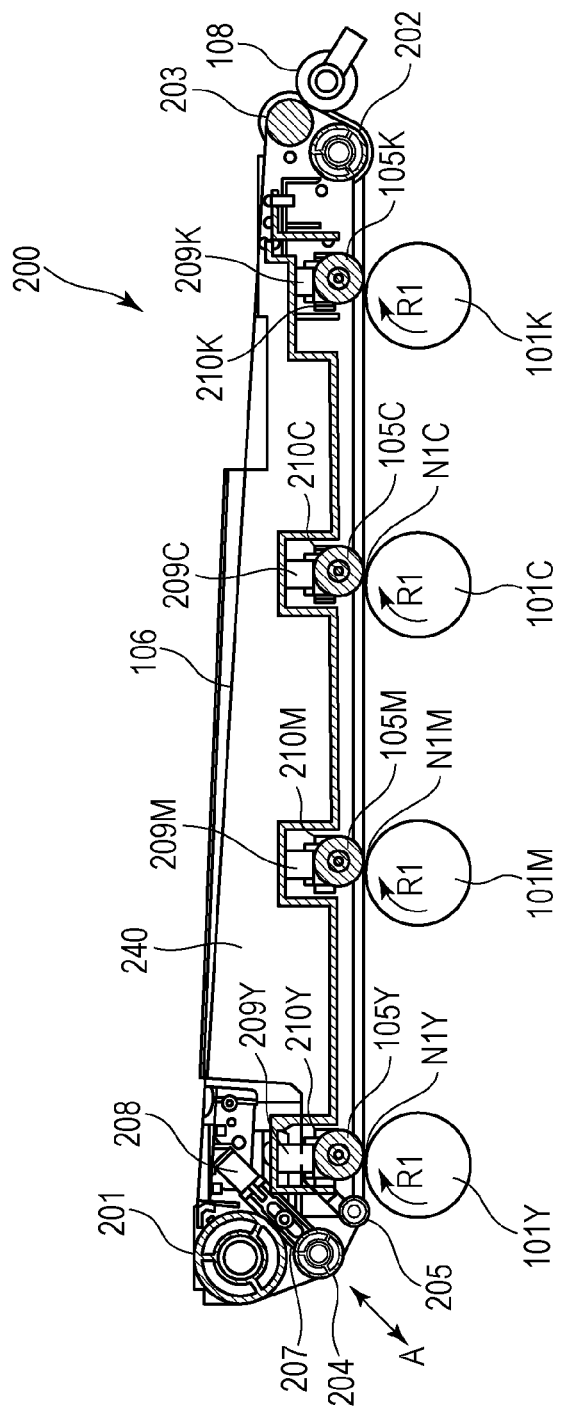
FIG. 2 is a schematic cross-sectional view of an intermediate transfer unit.

FIG. 2 is a schematic cross-sectional view of the intermediate transfer unit 200 (with the photosensitive drum 101 and secondary transfer roller 108 also illustrated). The intermediate transfer unit 200 has the intermediate transfer belt 106 serving as an intermediate transfer member. The intermediate transfer belt 106 in the present embodiment is configured of an endless belt (film) of polyimide. The material of the intermediate transfer belt 106 is not restricted to polyimide. Resins such as polyvinylidene difluoride (PVDF), polyamide, polyethylene terephthalate (PET), polycarbonate, and so forth, may be used, for example. The intermediate transfer belt 106 is suspended by five rollers, which are a drive roller 201, tension roller 204, auxiliary roller 205, idler roller 202, and secondary transfer opposed roller 203, which serve as the multiple suspending rollers.

Note that the four photosensitive drums 101 are arrayed in a generally straight line along the direction of movement of the intermediate transfer belt 106. The direction of array of the four photosensitive drums 101 is a generally horizontal direction in the present embodiment. More specifically, the four photosensitive drums 101 in the present embodiment are arrayed in a generally straight line, so that a tangent line at the intermediate transfer unit 200 side common to these photosensitive drums 101 is generally horizontal.

The drive roller 201 is rotationally driven by a belt driving motor 270 (FIG. 3) that serves as a drive source, and rotates (revolving movement, conveyance) the intermediate transfer belt 106 in the direction of the arrow R2 in FIG. 1. The surface of the drive roller 201 is formed of a rubber layer having a high friction coefficient, so that the intermediate transfer belt 106 can be conveyed without slippage. A support mechanism of the drive roller 201 will be described in detail later.

The tension roller 204 is rotatably supported at both ends in the rotation axis direction by a tension roller bearing member 207. The tension roller bearing member 207 is attached to a later-described first frame 240 that is movable in the direction of the arrow A in FIG. 2 (a direction from the inner peripheral face side of the intermediate transfer belt 106 toward the outer peripheral side, and the opposite direction). The tension roller bearing member 207 is biased from the inner peripheral face side of the intermediate transfer belt 106 toward the outer peripheral side by a tension spring 208 serving as a biasing unit. Accordingly, the tension roller 204 is biased from the inner peripheral face side of the intermediate transfer belt 106 toward the outer peripheral side, and is pressed against the inner peripheral face of the intermediate transfer belt 106. The tension spring 208 in the present embodiment is configured as a compression coil spring that is an elastic member, and is disposed between the tension roller bearing member 207 and a support seat provided to the first frame 240. Accordingly, even if there is variance in the length of the intermediate transfer belt 106 and dimensions of other parts, due to tolerance, the effects thereof are absorbed by the position of the tension roller 204 moving in the direction of the arrow A in FIG. 2, so the intermediate transfer belt 106 is suspended by a generally constant tension.

The auxiliary roller 205 forms an image transfer plane between itself and the idler roller 202 (a face where the intermediate transfer belt 106 is stretched into a general plane shape, where toner images are transferred from the photosensitive drums 101). The auxiliary roller 205 is rotatably supported by the first frame 240 at both ends in the rotation axis direction, by bearing members (omitted from illustration).

The idler roller 202 forms an image transfer plane between itself and the auxiliary roller 205. The idler roller 202 is rotatably supported by the first frame 240 at both ends in the rotation axis direction, by bearing members (omitted from illustration).

The secondary transfer opposed roller (secondary transfer inner roller) 203 nips the intermediate transfer belt 106 between itself and the secondary transfer roller (secondary transfer outer roller) 108 to form the secondary transfer portion N2. The secondary transfer opposed roller 203 is rotatably supported by the first frame 240 at both ends in the rotation axis direction, by bearing members (omitted from illustration).

The intermediate transfer unit 200 also has the above-described primary transfer rollers 105Y, 105M, 105C, and 105K. The primary transfer rollers 105Y, 105M, 105C, and 105K are disposed facing the photosensitive drums 101Y, 101M, 101C, and 101K, across the intermediate transfer belt 106. The primary transfer rollers 105 are disposed between the auxiliary roller 205 and the idler roller 202 in the direction of conveyance of the intermediate transfer belt 106. Each primary transfer roller 105 is rotatably supported at both ends in the rotation axis direction by a primary transfer roller bearing member 210 movably attached to the first frame 240. The primary transfer roller bearing members 210 are movably guided in one direction (the up/down direction in FIG. 2) by the first frame 240, and are biased in the direction toward the photosensitive drums 101 by primary transfer springs 209 serving as biasing units. The primary transfer springs 209 in the present embodiment are configured as compression coil springs that are elastic members, and are disposed in a compressed manner between the first frame 240 and the primary transfer roller bearing member 210. The primary transfer rollers 105 nip the intermediate transfer belt 106 between themselves and the photosensitive drums 101 to form the intermediate transfer portions N1.

3. Steering Mechanism

Figure 3:
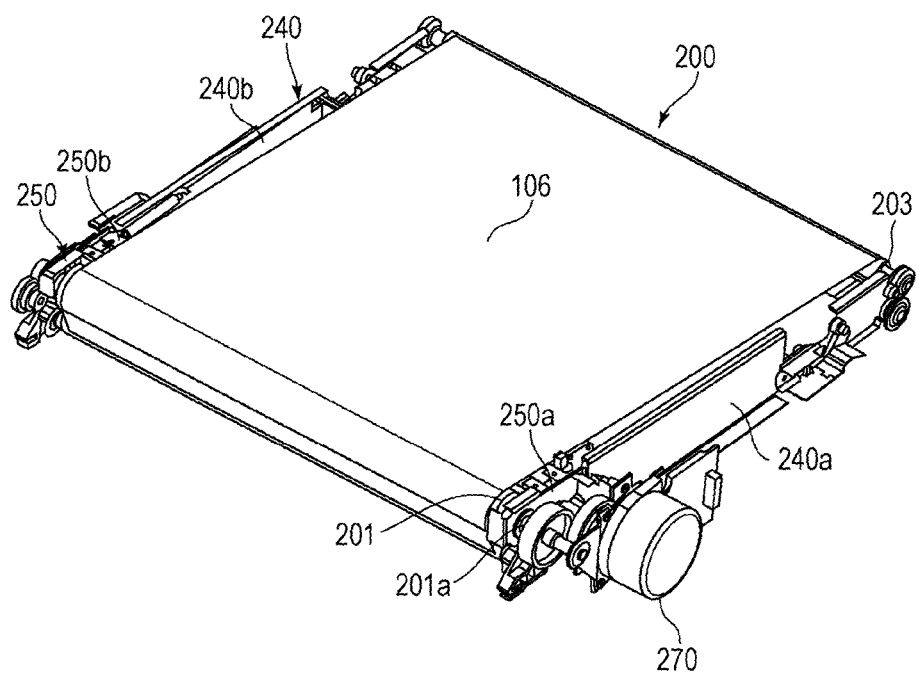
FIG. 3 is a perspective view of the intermediate transfer unit.
Figure 4:
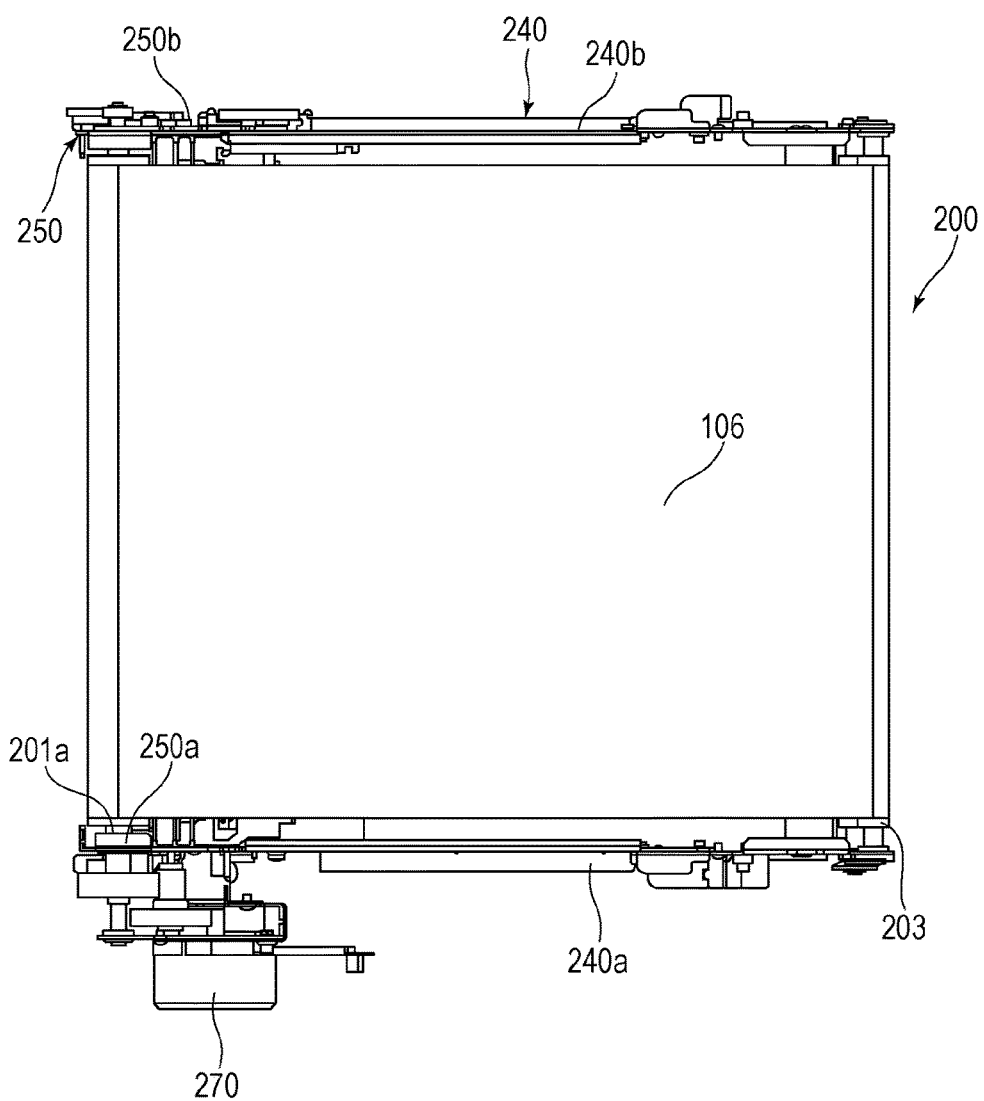
FIG. 4 is a top view of the intermediate transfer unit.
Figure 5:
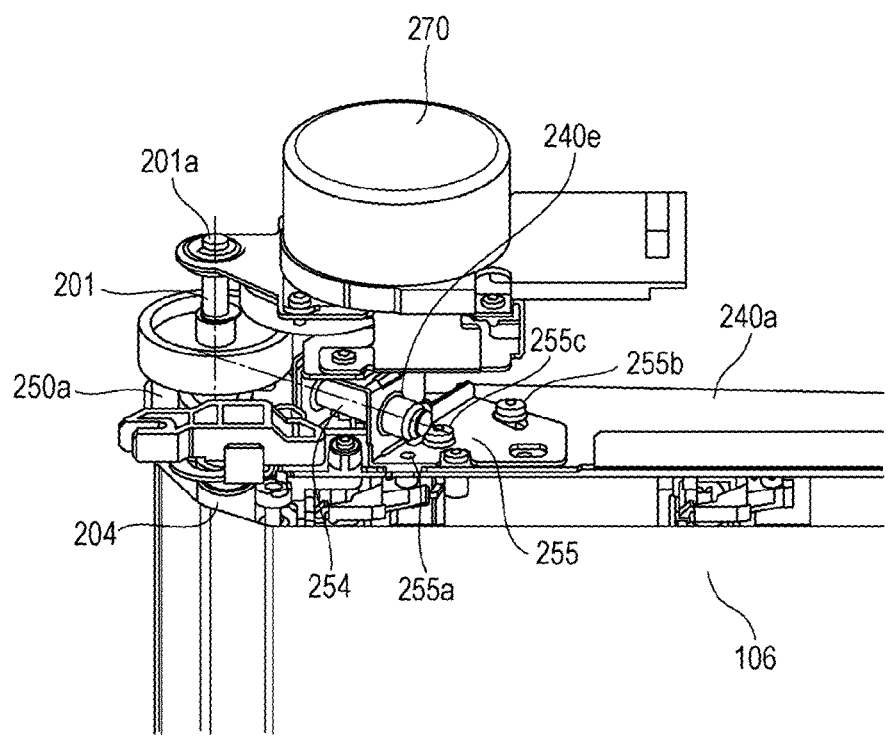
FIG. 5 is a partial perspective view of a steering mechanism.
Figure 6A:
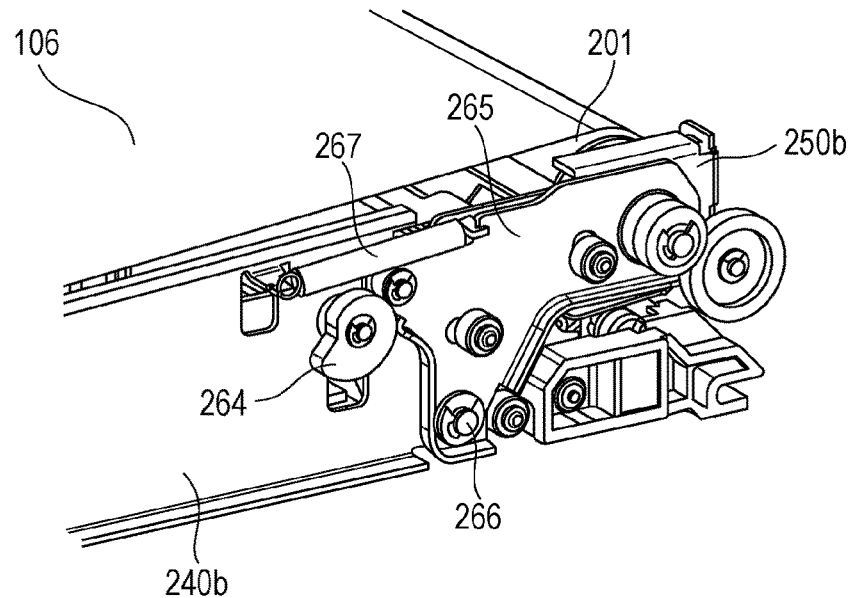
FIGS. 6A and 6B are partial perspective views of the steering mechanism.
Figure 6B:
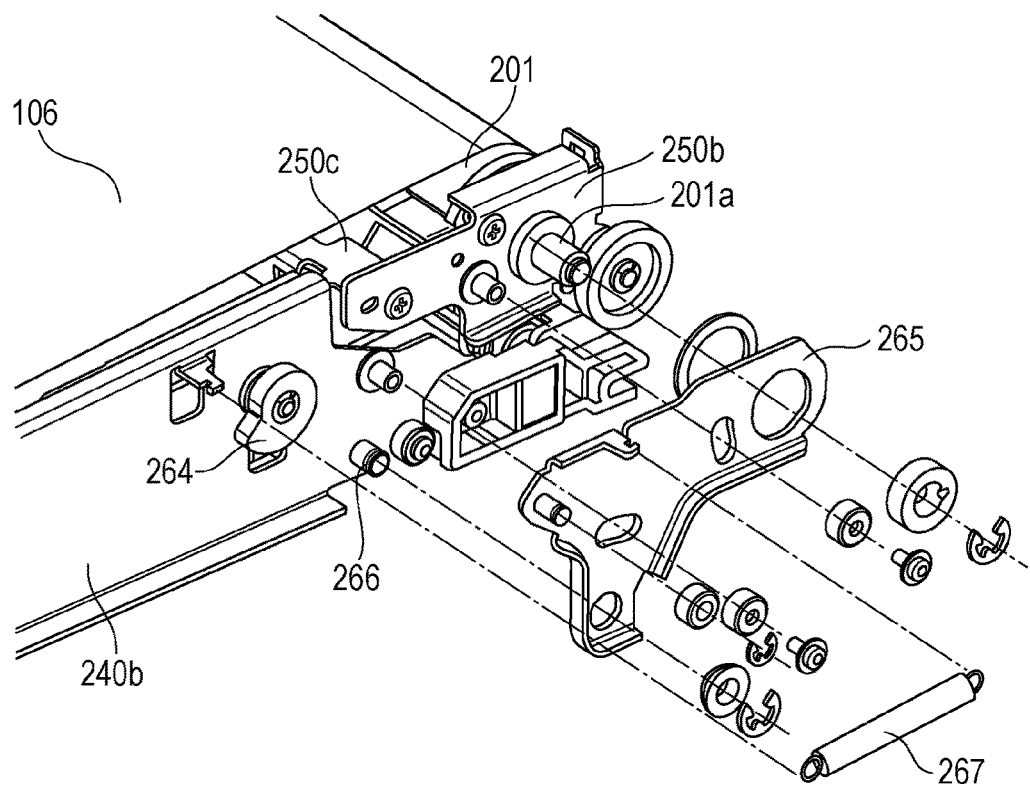
Figure 7:
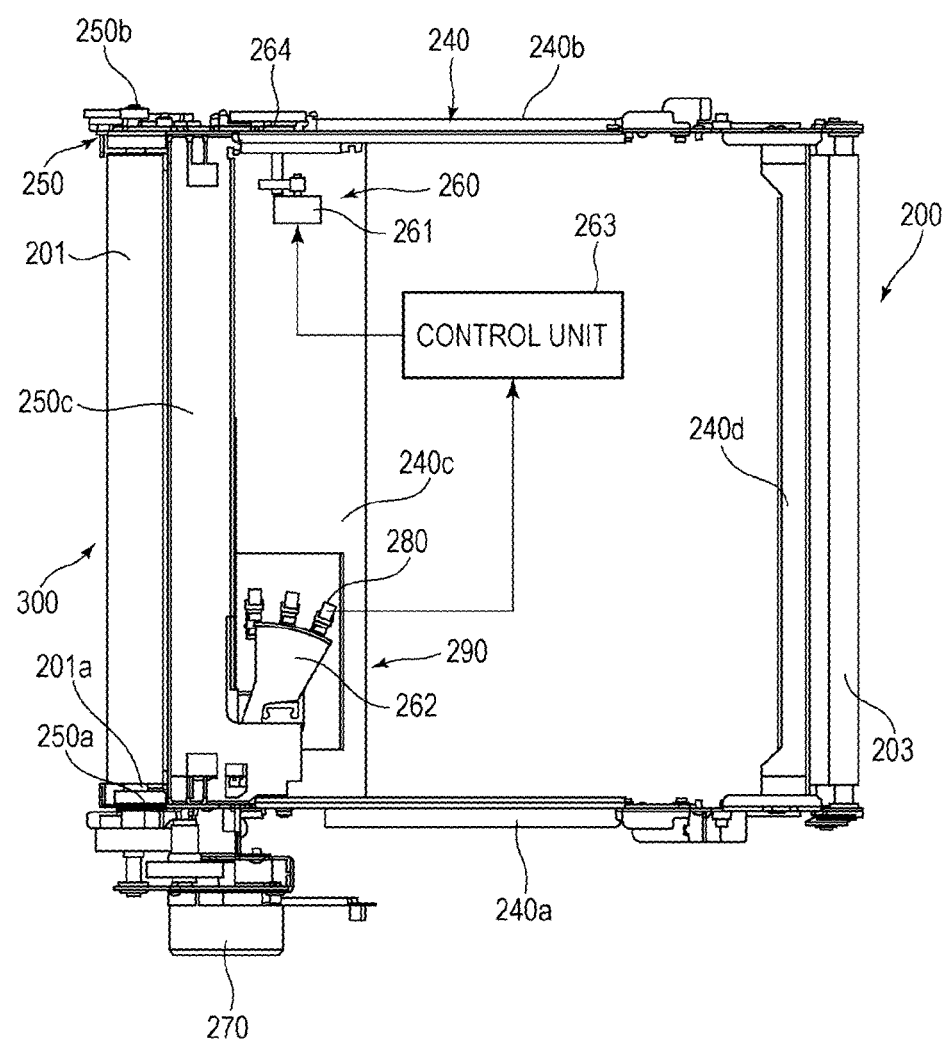
FIG. 7 is a plan view of the steering mechanism.
Figure 8:
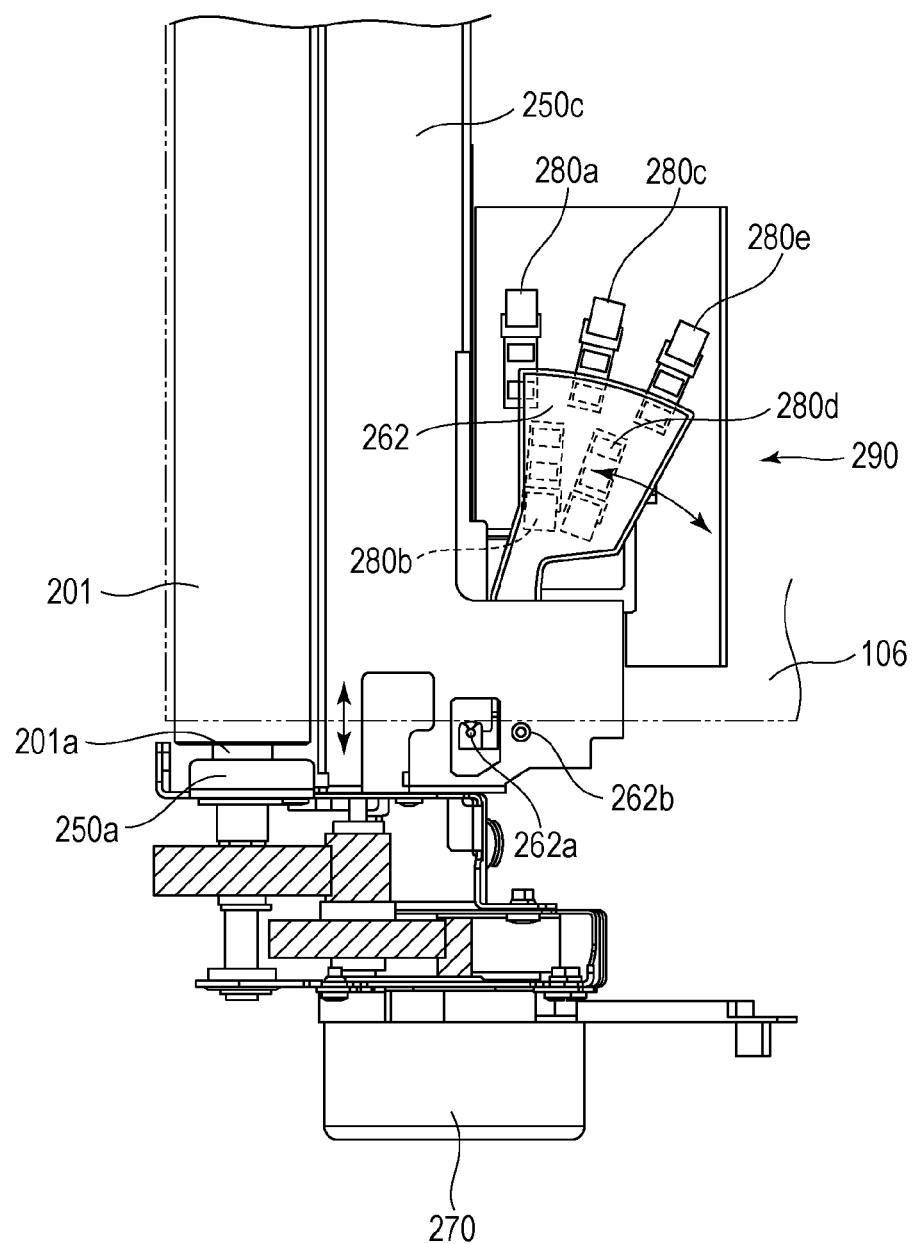
FIG. 8 is a plan view of a belt position detection mechanism.

Next, the steering mechanism that corrects shifting of the position of the intermediate transfer belt 106 in the width direction (hereinafter also referred to simply as "belt position") due to belt deviation, and returns the belt position to the generally middle position will be described. FIG. 3 is a perspective view of the intermediate transfer unit 200, from the frontal upper side. FIG. 4 is a top view of the intermediate transfer unit 200. FIG. 5 is a perspective view of the front side of the drive roller 201 as viewed from the lower side. FIG. 6A is a perspective view of the vicinity of the edge of the back side of the drive roller 201 as viewed from above, and FIG. 6B is a disassembled perspective view thereof. FIG. 7 is a plan view of a steering mechanism 300. FIG. 8 is a plan view of a later-described belt position detection mechanism. Note that part of the suspending rollers illustrated in FIGS. 1 and 2 are omitted from illustration in FIGS. 3 through 8. Also note that FIG. 7 illustrates a state where the intermediate transfer belt 106 is removed from the intermediate transfer unit 200.

In the present embodiment, out of the multiple suspending rollers over which the intermediate transfer belt 106 is suspended, the drive roller 201 that rotationally drives the intermediate transfer belt 106 also serves as a steering roller that inclines as to the other suspending rollers in order to correct the belt position. Note however, that the present invention is not restricted to a configuration where the steering roller also serves as the drive roller. For example, in a suspending configuration such as illustrated in FIG. 2, the idler roller 202 or secondary transfer opposed roller 203 may be used as a drive roller, with the steering roller and drive roller being different suspending rollers.

Of the multiple rollers over which the intermediate transfer belt 106 is suspended, the suspending rollers 202 through 205 excluding the drive roller (hereinafter referred to as "steering roller") 201, and the primary transfer rollers 105, are rotatably supported by the first frame 240 at both ends in the rotation axis direction. The first frame 240 is configured by side plates 240a and 240b at the front side and back side in the thrust direction being connected by two beam plates 240c and 240d, as illustrated in FIG. 7.

Of the multiple suspending rollers over which the intermediate transfer belt 106 is suspended, the steering roller 201 has the front-side end (first end) of a rotation shaft 201a rotatably supported by a second frame 250 that is different from the above-described first frame 240. Also, a back-side end (second end) of the rotation shaft 201a of the steering roller 201, which is the opposite side form the first end, is rotatably supported by a later-described steering arm 265 (FIGS. 6A and 6B). The second frame 250 is configured with side plates 250a and 250b in the front side and back side in the thrust direction being connected by a beam plate 250c serving as a linking portion, as illustrated in FIG. 7. An inclining shaft 254 provided to the side plate 250a at the front side of the second frame 250 as a first pivot shaft is supported by a support portion (supporting hole) 240e provided to the first frame 240 so as to be capable of pivoting (rocking), as illustrated in FIG. 5. The back-side end of the second frame 250 in the thrust direction rotatably holds the back-side end of the rotation shaft 201a of the steering roller 201, and is supported by the later-described steering arm 265

(FIGS. 6A and 6B) via the steering roller 201. Accordingly, the second frame 250 is capable of inclining as to the first frame 240.

The belt driving motor 270 is fixed to the front side of the second frame 250 in the thrust direction (the same end side to which the inclining shaft 254, serving as the center of inclination of the second frame 250, is provided). The drive force of the belt driving motor 270 is transmitted to the steering roller 201 via a gear train on the second frame 250.

The steering arm 265 is supported by the first frame 240 so as to be capable of pivoting (rocking) centered on an arm pivot shaft 266 that serves as a second pivot shaft provided on a side face of the back-side side plate 240b of the first frame 240, as illustrated in FIGS. 6A and 6B. The steering arm 265 is a rocking support plate that rocks the back-side end of the steering roller 201, with the arm pivot shaft 266 as the center of rotation. The steering arm 265 also rotatably supports the back-side end of the rotation shaft 201a of the steering roller 201, separately from the second frame 250. Accordingly, the steering arm 265 pivots on the arm pivot shaft 266, above the side face of the first frame 240, and also pivots on the rotation shaft 201a of the steering roller 201 above the side face of the second frame 250. An eccentric cam 264 is provided on the side face of the side plate 240b at the back side of the first frame 240. The steering arm 265 is biased in a direction of pivoting in the counterclockwise direction in FIGS. 6A and 6B on the arm pivot shaft 266, by a steering spring 267 serving as a biasing unit, so as to come into contact with this eccentric cam 264. The steering spring 267 in the present embodiment is configured as a tension coil spring that is an elastic member, with both ends in the extension direction being hooked onto retaining portions provided to the side plate 240b at the back side of the first frame 240 and the steering arm 265. The eccentric cam 264 is rotationally driven by a steering motor 261 serving as a drive force, and the angular position of the steering arm 265 in the pivoting direction is determined by the stopping position of the eccentric cam 264, as illustrated in FIG. 7. The steering motor 261 is attached to the beam plate 240c of the first frame 240. Accordingly, changing the stopping position of the eccentric cam 264 enables the position of the back-side end of the rotation shaft 201a of the steering roller 201 to be moved along a movement path, which will be described in detail later. A steering drive unit 260 is configured having the steering motor 261 and the eccentric cam 264 in the present embodiment.

A belt position detection mechanism 290 for detecting the belt position is provided to the intermediate transfer unit 200, as illustrated in FIG. 8. The belt position detection mechanism 290 is configured including a belt edge sensor flag (hereinafter simply referred to as "flag") 262 serving as a detecting unit, and multiple (five in the present embodiment) transmitting photo interrupters 280a through 280e in the present embodiment. The flag 262 is attached to the beam plate 250c of the second frame 250. The flag 262 is supported so as to be capable of pivoting (rocking) on a flag pivot shaft 262b. A rotatable detection roller 262a is provided to one end of the flag 262, and a light-shielding unit (omitted from illustration) that shields the photo interrupters 280a through 280e in accordance with the angular position of the flag 262 in the pivoting direction is provided at the other end. The flag 262 is biased so that the detection roller 262a pivots in the direction of coming into contact with the end face (edge) of front side of the intermediate transfer belt 106, and pivots when belt deviation occurs. Depending on the belt position, the flag 262 shields the photo interrupters 280a through 280e, thereby changing the combination of output signals of the photo interrupters 280a through 280e in accordance with the belt position. FIG. 9 illustrates the relationship between the combinations of output signals of the photo interrupters 280a through 280e, and the corresponding belt position in ten stages of No. 0 through No. 9.

Note that while the belt position is detected in ten stages by the five photo interrupters 280a through 280e in the present embodiment, this is not restrictive. For example, the number of photo interrupters may be increased and the belt position may be detected in a greater number of stages, or the opposite. Also, while the photo interrupters 280a through 280e are disposed so as to be shielded by the flag 262 in order, as illustrated in FIG. 9 in the present embodiment, this is not restrictive. The relationship between the combinations of output signals of the photo interrupters and the belt position differ depending on the shape of the flag and the layout of the photo interrupters, and so forth. Moreover, it is sufficient for the belt position detection mechanism 290 to be able to detect the belt position, and accordingly the belt position detection mechanism 290 is not restricted to an arrangement of having a flag and multiple photo interrupters as in the present embodiment. For example, an arrangement may be made where the belt position is continuously detectable.

A control unit 263 causes the steering motor 261 to operate in accordance with the output signals of the photo interrupters 280a through 280e, as illustrated in FIG. 7. Rotation of the eccentric cam 264 by the drive force of the steering motor 261 causes the steering arm 265 to pivot, and the steering roller 201 inclines. Accordingly, the position of the intermediate transfer belt 106 in the width direction is corrected as the intermediate transfer belt 106 revolves.

Figure 10:
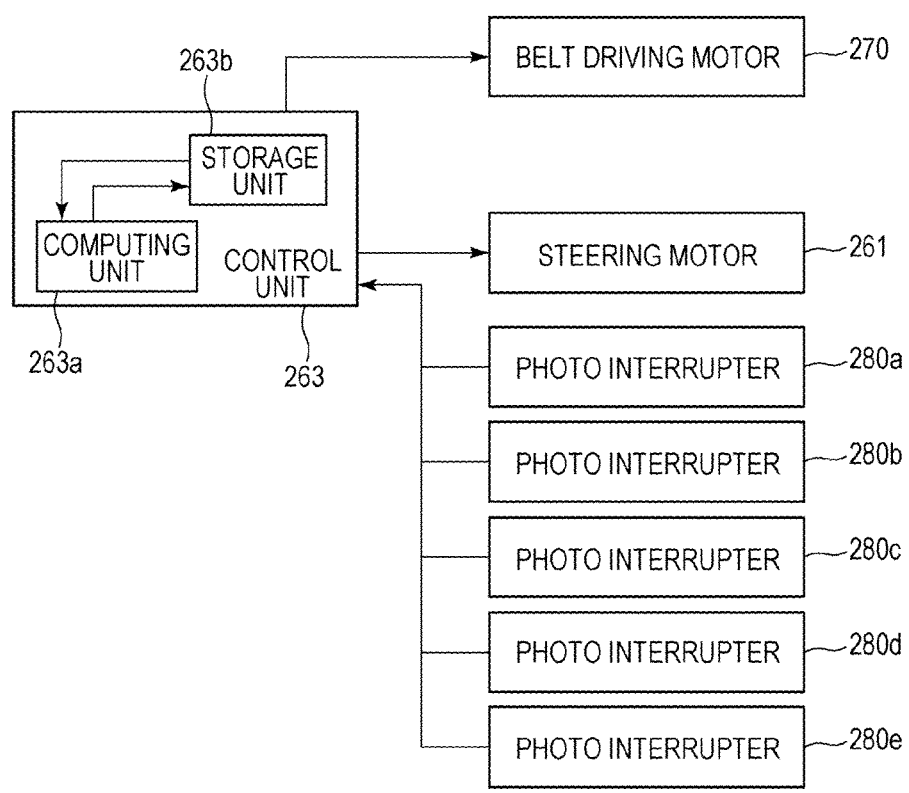
FIG. 10 is a schematic control block diagram relating to steering control.
Figure 11:
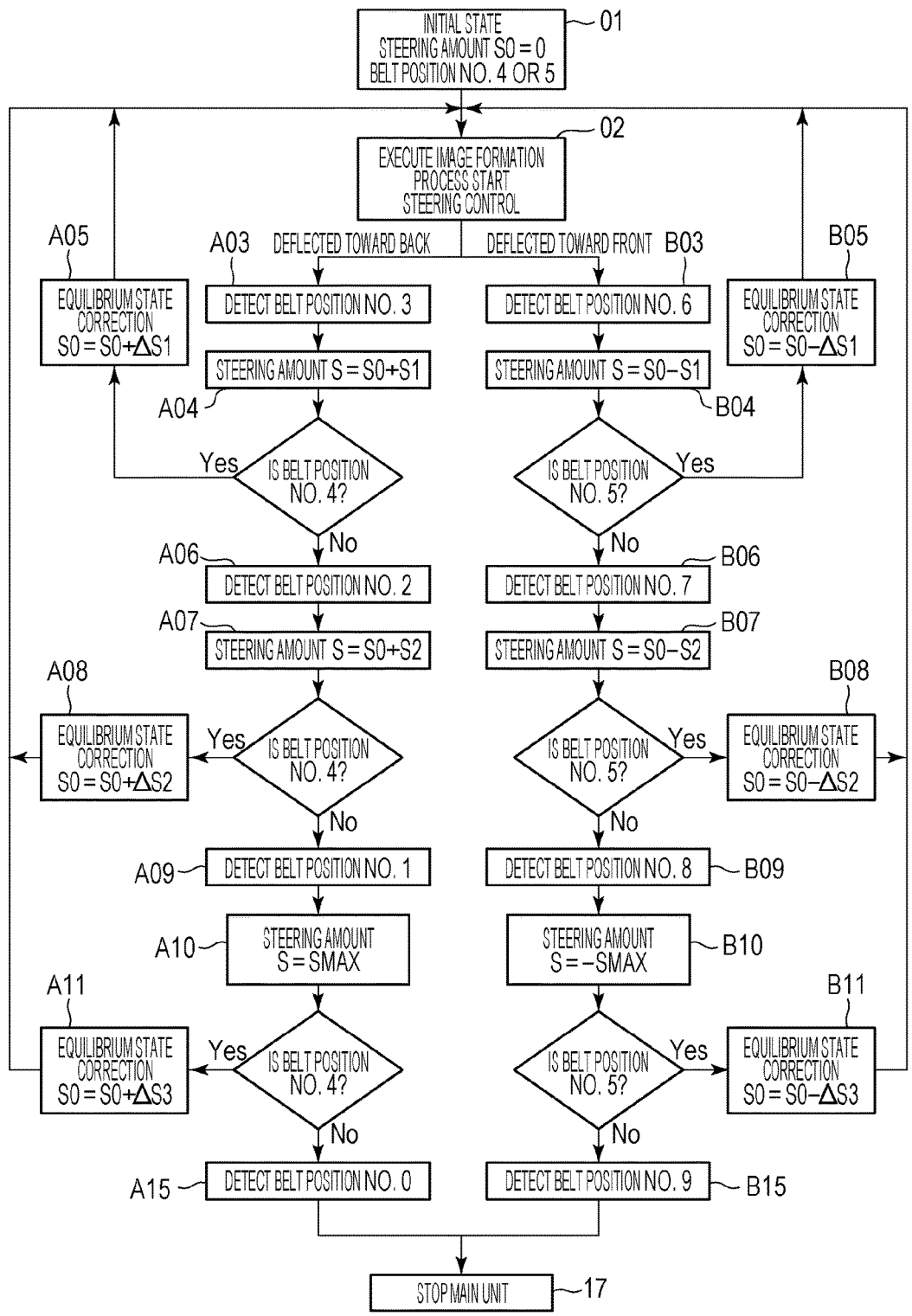
FIG. 11 is a flowchart of steering control.

The second frame 250, inclining shaft 254, support portion 240e, steering arm 265, steering drive unit 260, belt position detection mechanism 290, control unit 263, and so forth, make up the steering mechanism 300 in the present embodiment. The flow of steering control by the steering mechanism 300 according to the present embodiment will be described with reference to FIGS. 9 through 11. FIG. 10 is a schematic block diagram relating to steering control, and FIG. 11 is a schematic flowchart of steering control.

The belt driving motor 270, steering motor 261, photo interrupters 280a through 280e of the belt position detection mechanism 290, and so forth, are connected to the control unit 263. The control unit 263 has a computing unit 263a that computes an appropriate amount of inclination of the steering roller 201 from the belt position detected by the belt position detection mechanism 290, and a storage unit 263b that stores the calculated inclination amount.

The home position of the eccentric cam 264 is a position where the steering roller 201 assumes an attitude generally parallel to the other suspending rollers. The belt position is at the general middle when at No. 4 or No. 5 (step 01).

First, a case will be described where the intermediate transfer belt 106 deviates toward the back side as image formation is performed (step 02). In this case, the belt position changes in the order of No. 3, No. 2, and No. 1. When the belt position is at No. 4 or No. 5, the eccentric cam 264 remains at the home position. When the belt position changes to No. 3 (step A03), the control unit 263 rotates the eccentric cam 264 by a predetermined rotation amount (rotational angle), so that the inclination amount (inclination angle, steering amount) S of the steering roller 201 is S0+S1 (step A04). That is to say, the control unit 263 attempts to return the belt position to the generally middle position. In a case where this returns the belt position back to No. 4 again, the following processing is performed.

The control unit 263 uses the computing unit 263a to obtain an inclination amount S0 (hereinafter also referred to as "equilibrium point") of the steering roller 201, where the belt position is in an equilibrium state of moving toward neither the front side nor the back side, based on the rotation amount (inclination amount S) of the eccentric cam 264 in step A04. The control unit 263 then updates the equilibrium point S0 that had been stored in the storage unit 263b so far with the newly-calculated equilibrium point S0, and keeps the eccentric cam 264 at this position to keep the belt position at the generally middle position (step A05).

In a case where the eccentric cam 264 has been rotated in step A04 but the belt position has continued to move toward the back side and has reached No. 2 (step A06), the following processing is performed. The control unit 263 further rotates the eccentric cam 264 by a predetermined rotation amount, to where the inclination amount S of the steering roller 201 is increased to S0+S2 (S2>S1) (step A07). In a case where this returns the belt position back to No. 4 again, the control unit 263 updates the equilibrium point S0 based on the rotation amount (inclination amount S) of the eccentric cam 264 in step A07, and keeps the eccentric cam 264 at this position to keep the belt position at the generally middle position (step A08).

In a case where the eccentric cam 264 has been rotated in step A07 but the belt position has continued to move toward the back side, the belt position reaches No. 1 (step A09). This belt position No. 1 corresponds to a state where the belt position has maximally moved to the back side of the range where steering control can be performed. If the belt position further moves to the back side and reaches No. 0, the operations of the image forming apparatus 100 are shut down, since trouble may occur. Accordingly, in a case where the belt position reaches No. 1, the control unit 263 rotates the eccentric cam 264 so that the inclination amount S of the steering roller 201 is maximum (SMAX) (step A10).

Next, a case will be described where the intermediate transfer belt 106 deviates toward the front side as image formation is performed (step 02). In this case, the belt position changes in the order of No. 6, No. 7, and No. 8. When the belt position changes to No. 6 (step B03), the control unit 263 rotates the eccentric cam 264 by a predetermined rotation amount in the opposite direction from that in step A04, so that the inclination amount S of the steering roller 201 is S0−S1 (step B04). In a case where this returns the belt position back to No. 5, the control unit 263 updates the equilibrium point S0 based on the rotation amount (inclination amount S) of the eccentric cam 264 in step B04, and keeps the eccentric cam 264 at this position to keep the belt position at the generally middle position (step B05).

In a case where the eccentric cam 264 has been rotated in step B04 but the belt position has continued to move toward the front side and has reached No. 7 (step B06), the following processing is performed. The control unit 263 further rotates the eccentric cam 264 by a predetermined rotation amount, to where the inclination amount S of the steering roller 201 is increased to S0−S2 (S2>S1) (step B07). In a case where this returns the belt position back to No. 5, the control unit 263 updates the equilibrium point S0 based on the rotation amount (inclination amount S) of the eccentric cam 264 in step B07, and keeps the eccentric cam 264 at this position to keep the belt position at the generally middle position (step B08).

In a case where the eccentric cam 264 has been rotated in step B07 but the belt position has continued to move toward the front side, the belt position reaches No. 8 (step B09). In this case, the control unit 263 rotates the eccentric cam 264 so that the inclination amount S of the steering roller 201 is maximum (−SMAX) in the direction opposite to that in step A10 (step B10).

In a case where the inclination amount of the steering roller 201 has been set to maximum and the belt position returns to No. 4 or No. 5, the following processing is performed. The control unit 263 updates the equilibrium point S0 based on the maximum inclination amount (SMAX or −SMAX), and keeps the eccentric cam 264 at this position to keep the belt position at the generally middle position (steps A11, B11). If the belt position still continues to change even though the inclination amount is maximum, the belt position No. 0 or No. 9 where trouble may occur is reached (steps A15, B15), so the control unit 263 shuts down operations of the image forming apparatus 100 (step S17).

4. Positioning of Inclining Shaft and Arm Pivot Shaft

Figure 12:
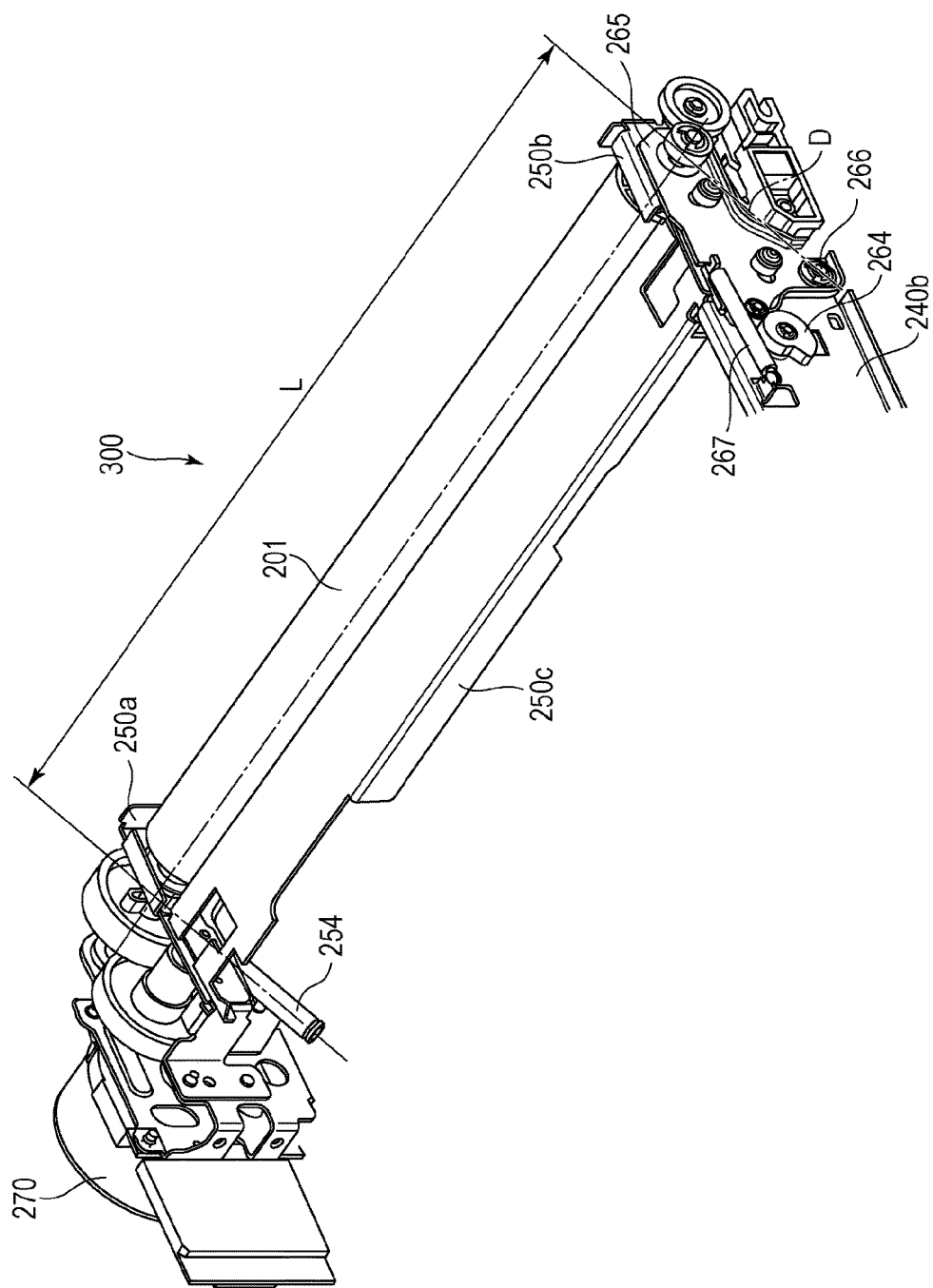
FIG. 12 is a perspective view of the steering mechanism.
Figure 13:
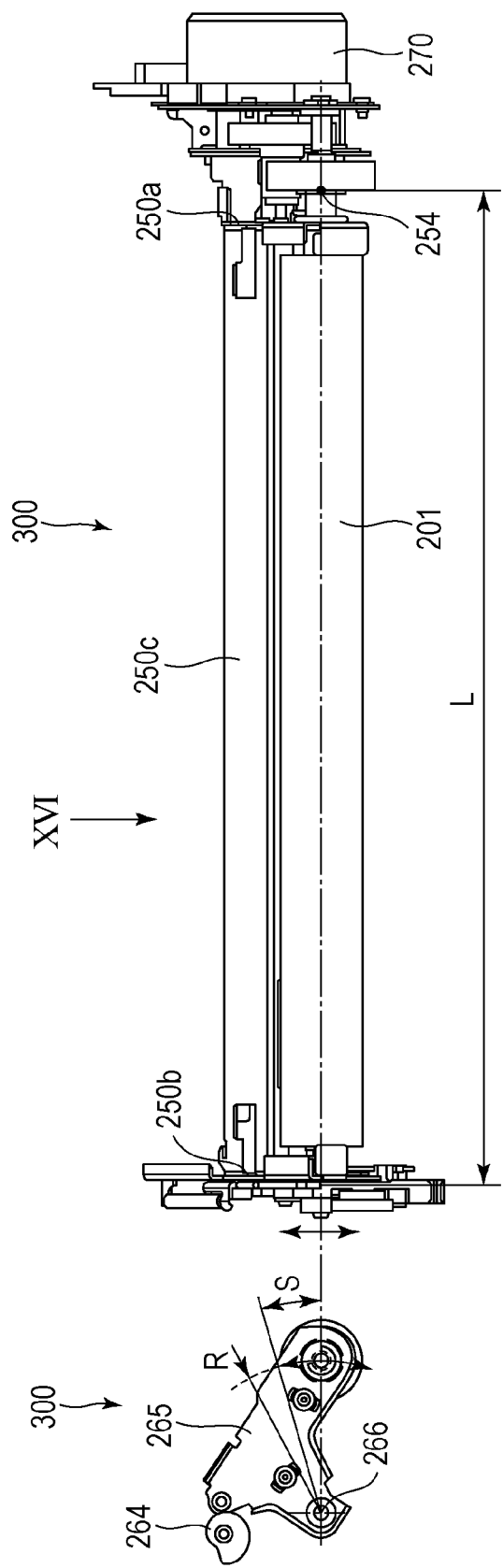
FIG. 13 is a side view of the steering mechanism.
Figure 14:
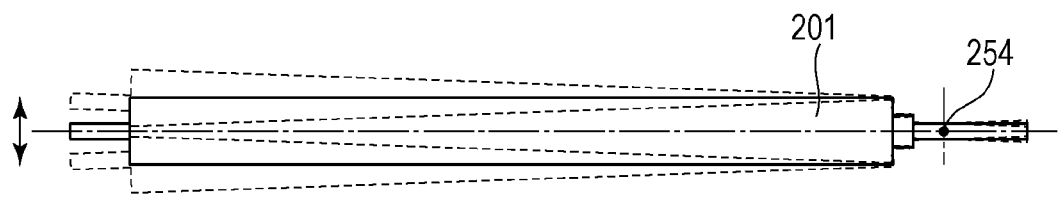
FIG. 14 is a schematic diagram illustrating an inclined state of the steering roller.

Next, the positioning of the inclining shaft 254 and arm pivot shaft 266 in the steering mechanism 300 according to the present embodiment will be described in further detail. FIG. 12 is a perspective view of the steering mechanism 300 as viewed from the back side. FIG. 13 illustrates side views of the steering mechanism 300, as viewed from the axial line direction of the inclining shaft 254 (to the right) and from the axial line direction of the arm pivot shaft 266 (to the left). FIG. 14 is a schematic representation of the inclination state of the steering roller 201 as viewed from the axial line direction of the inclining shaft 254.

To begin with, the inclining shaft 254 extends along an axial line (first axial line) intersecting with rotation axis of the steering roller 201. In particular, the axial line (first axial line) of the inclining shaft 254 is provided so as to pass through the rotation axis of the steering roller 201 and to be generally orthogonal with this rotation axis in the present embodiment, as illustrated in FIGS. 12 and 13. According to the present embodiment, no twisting occurs at the support portion of the rotation shaft 201a of the steering roller 201 in the second frame 250 even when the steering roller 201 is being inclined. Also, according to the present embodiment, the attitude of the steering roller 201, when inclined from the attitude of being generally parallel to the other suspending rollers is symmetrical in the positive and negative directions of inclination, which can be seen from FIG. 14. This enables the perceived amount of deviation of the belt position due to inclination of the steering roller 201 to be reduced, and the belt position can be controlled with higher precision.

The inclination path of the steering roller 201 can be precisely stipulated by the positioning of the arm pivot shaft 266 as to the first frame 240. The arm pivot shaft 266 extends along an axial line that is generally parallel with the rotation axis of at least one other suspending roller than the steering roller 201 (all suspending rollers besides the steering roller in the present embodiment) and generally orthogonal to the axial line of the inclining shaft 254 (second axial line). In particular, the arm pivot shaft 266 according to the present embodiment is provided such that the axial line thereof (second axial line) passes through the axial line of the inclining shaft 254, as illustrated in FIG. 13.

In further detail, the inclination path of the steering roller 201 (represented by the movement path of the center of rotation at the back-side end of the rotation shaft 201a of the steering roller 201) preferably is decided having taken into consideration various effects such as described below. That is to say, performing inclination operations of the steering roller generally tends to generate change in the speed of the image transfer face of the intermediate transfer belt in particular, and color misregistration and dimensional deviation of the toner image formed on the intermediate transfer belt occurs more readily.

Also, there are cases where the suspension form of the intermediate transfer belt is changed by separating part of the suspending rollers suspending the intermediate transfer belt, or the primary transfer members or the like, from the inner peripheral face of the intermediate transfer belt and so forth. For example, there are cases where the contact/separated state of photosensitive drums and the intermediate transfer belt are switched depending on whether in a color mode where an image is formed using all image forming units, or a monochromatic mode where a monochrome image, such as a black-and-white image, is formed. As one example, the photosensitive drums of all image forming units are in contact with the intermediate transfer belt in the color mode, while only the photosensitive drum of the image forming unit for black is in contact with the intermediate transfer belt in the monochromatic mode. At this time, primary transfer members, and further at least one suspending roller, may be separated from the inner peripheral face of the intermediate transfer belt, in order to secure a distance of separation between photosensitive drums and the intermediate transfer belt. In such a configuration, the movement speed in the width direction of the belt that can be generated with regard to the incremental inclination amount of the steering roller (correction capabilities as to positional deviation in the width direction of the belt) may greatly change, depending on the way in which the intermediate transfer belt is suspended. In a case where the movement speed of the intermediate transfer belt in the width direction is excessively great as to the amount of inclination of the steering roller, control stability of the belt position may be lost. On the other hand, in a case where the movement speed of the intermediate transfer belt in the width direction is excessively small as to the amount of inclination of the steering roller, sufficient control capabilities to overcome external disturbance such as misalignment of suspending rollers may not be able to be exhibited.

Further, the suspension distance of the intermediate transfer belt changes when the steering roller is inclined, so the tension roller inclines to take up this. In a case where the friction coefficient at the surface of the tension roller and the inner peripheral face of the intermediate transfer belt is sufficiently low, and the belt wrap distance of the intermediate transfer belt as to the tension roller is sufficiently small, steering operations due to inclination of the tension roller are small. However, there are cases where displacement of the tension roller results in the amount of stretching/compression of the tension springs pressing the tension roller differing between the ends in the rotation axis direction of the tension roller, and the belt wrap angle may be different depending on the position of the intermediate transfer belt in the width direction. In this case, difference may occur in tension in the intermediate transfer belt, which can lead to undulation in the intermediate transfer belt and increased local friction force at the suspending rollers.

The arm pivot shaft 266 is positioned to realize circular arc approximation of the desired inclination path of the steering roller 201 in the present embodiment, in order to suppress the various effects described above. For example, in a case of minimizing the displacement of the tension roller 204, circular arc approximation of the desired inclination path of the steering roller 201 can be realized as follows. That is to say, an arrangement where the respective sums of two common tangents connecting the secondary transfer opposed roller 203 and the steering roller 201, and the secondary transfer opposed roller 203 and the tension roller 204, and the belt wrap distance of the intermediate transfer belt 106 as to each of the rollers, are constant, can achieve this.

Figure 15:
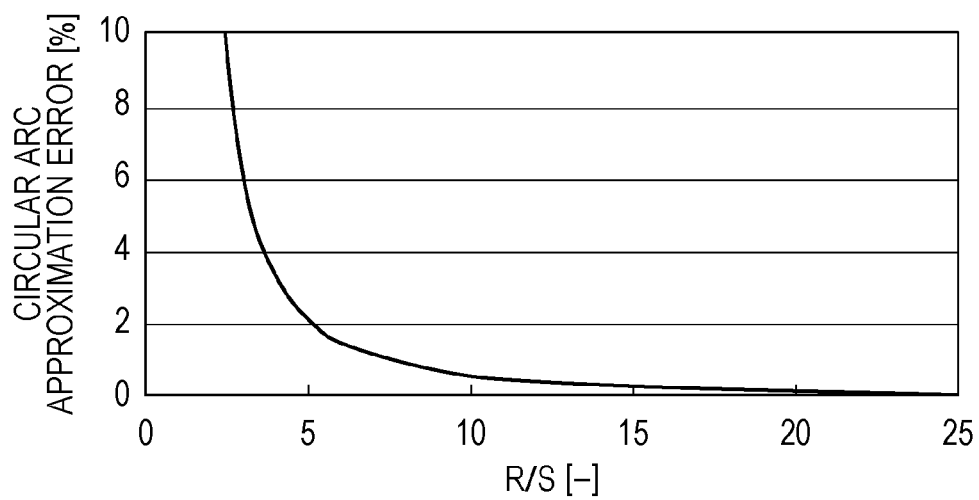
FIG. 15 is a graph illustrating approximation error in circular arc approximation of the inclination path of the steering roller.

Note that in order to achieve ideal circular arc approximation, the arm pivot shaft 266 will be positioned at a distance equal to the radius of curvature of the inclination path, in the normal direction of the inclination path. However, in a case where the inclination path is extremely close to a straight line, for example, the radius of curvature will be great, making this positioning difficult. However, in a case where the ratio of pivot ratio R as to inclination distance S exceeds 10 as illustrated in FIG. 15, the approximation error in the radial direction falls below 0.5%. That is to say, in a case where the ratio of pivot ratio R as to inclination distance S exceeds 10, the approximation error in the pivot radial direction as to inclination distance S of 1 mm is 0.05 mm or lower, which is sufficiently small. Although this is not restrictive, the above-described approximation error of 0.5% or less is often negligible, for example. Accordingly, circular arc approximation of the inclination path of the steering roller 201 can be realized within a range where the arm pivot shaft 266 of the steering arm 265 can be positioned. Note that in the present embodiment, the pivot radius R is 60 mm, the inclination distance S is 3 mm, and the above-described approximation error is 0.13%. The inclination distance S here is represented by the distance of movement of the center of rotation at the back-side end of the rotation shaft 201a of the steering roller 201, as illustrated to the left in FIG. 13. The pivot radius R is represented by the distance between the center of rotation at the back-side end of the rotation shaft 201a of the steering roller 201 and the center of pivoting of the arm pivot shaft 266.

Next, the relative positional relationship between the inclining shaft 254 and the arm pivot shaft 266 will be described. The arm pivot shaft 266 preferably is positioned as follows in a case where the rotation axis of the steering roller 201 and the rotation axis of at least one suspending roller supported by the first frame 240 are generally parallel, as illustrated in FIG. 12. Note that in the present embodiment, the rotation axis of the steering roller 201 and the rotation axes of all suspending rollers besides the steering roller 201 are generally parallel. That is to say, the positioning is preferably such that a straight line (line segment) D connecting the center of pivoting of the steering arm 265 and the center of rotation of the steering roller 201 is generally parallel to the axial line (first axial line) of the inclining shaft 254. This straight line D is generally orthogonal to the axial line of the arm pivot shaft 266 (second axial line) and the rotation axis of the steering roller 201. The arm pivot shaft 266 is thus positioned in the present embodiment.

Figure 16:
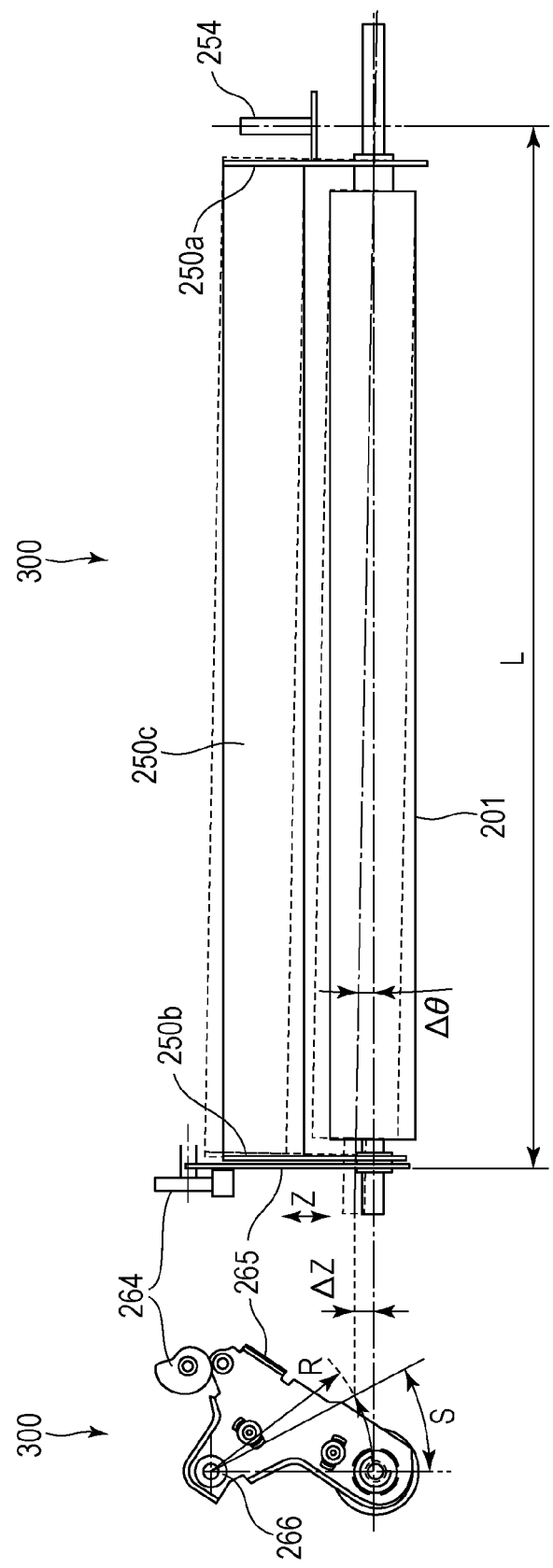
FIG. 16 is a side view of the steering mechanism.

To further the description, the steering roller 201 inclines around the inclining shaft 254, and the back-side end moves along an arc path around the arm pivot shaft 266, as described earlier. FIG. 16 illustrates the behavior of the steering roller 201 at this time, as viewed from a direction generally orthogonal to the rotation axis of the steering roller 201 and axial line of the arm pivot shaft 266, i.e., from the direction of arrow XVI in FIG. 13. FIG. 16 shows that when the steering roller 201 inclines, the rotation axis of the steering roller 201 also slightly moves in the axial line direction of the inclining shaft 254 (direction of arrow Z in FIG. 16) as the steering arm 265 pivots. That is to say, the angle between the rotation axis of the steering roller 201 and the axial line of the inclining shaft 254 slightly changes. If this angular change $\Delta\theta$ is excessively great, warping can conceivably occur at the second frame 250 inclining around the inclining shaft 254. However, setting the position of the arm pivot shaft 266 such that the straight line D is generally parallel with the axial line of the inclining shaft 254 as described above enables this angular change Δθ to be minimized. Specifically, the distance from the arm pivot shaft 266 to the inclining shaft 254 in the thrust direction is set to L=400 mm, the pivot radius of the steering roller 201 around the arm pivot shaft 266 is set to R=50 mm, and the inclination distance is set to S=5 mm, as one example. In this case, the above-described angular change Δθ is 0.036 deg which is extremely small, and is sufficiently negligible. Although this is not restrictive, the above-described angular change Δθ of 0.1 deg or less, for example, is often negligible. Note that the axial line of the inclining shaft 254 being generally orthogonal to the rotation axis of the steering roller 201 includes cases where the angle between the rotation shaft 201a of the steering roller 201 and axial line of the inclining shaft 254 changes within such a negligible range as described above.

5. Adjustment Mechanism

The inclining shaft 254 provided to the second frame 250 is supported by the front-side side plate 240a of the first frame 240 via a support plate 255 serving as a bearing member attached to the front-side side plate 240a of the first frame 240 in the present embodiment, as illustrated in FIG. 5. That is to say, the second frame 250 is pivotably supported as to the first frame, by the inclining shaft 254 serving as the support unit and the support plate 255. The angular position in the rotational direction of this support plate 255, centered on an axial line (third axial line) parallel to the axial line of the arm pivot shaft 266, can be adjusted. The support plate 255 is provided with a pivot center hole 255a that engages a protrusion provided to the front-side side plate 240a of the first frame 240 in the present embodiment. The axial line of the pivot center hole 255a passes through the axial line of the inclining shaft 254, and is generally orthogonal to the axial line of the inclining shaft 254. The angular position of the support plate 255 in the rotational direction centered on the pivot center hole 255a thus can be adjusted, by loosening screws 255b and 255c fixing the support plate 255 to the front-side side plate 240a of the first frame 240.

Figure 17:
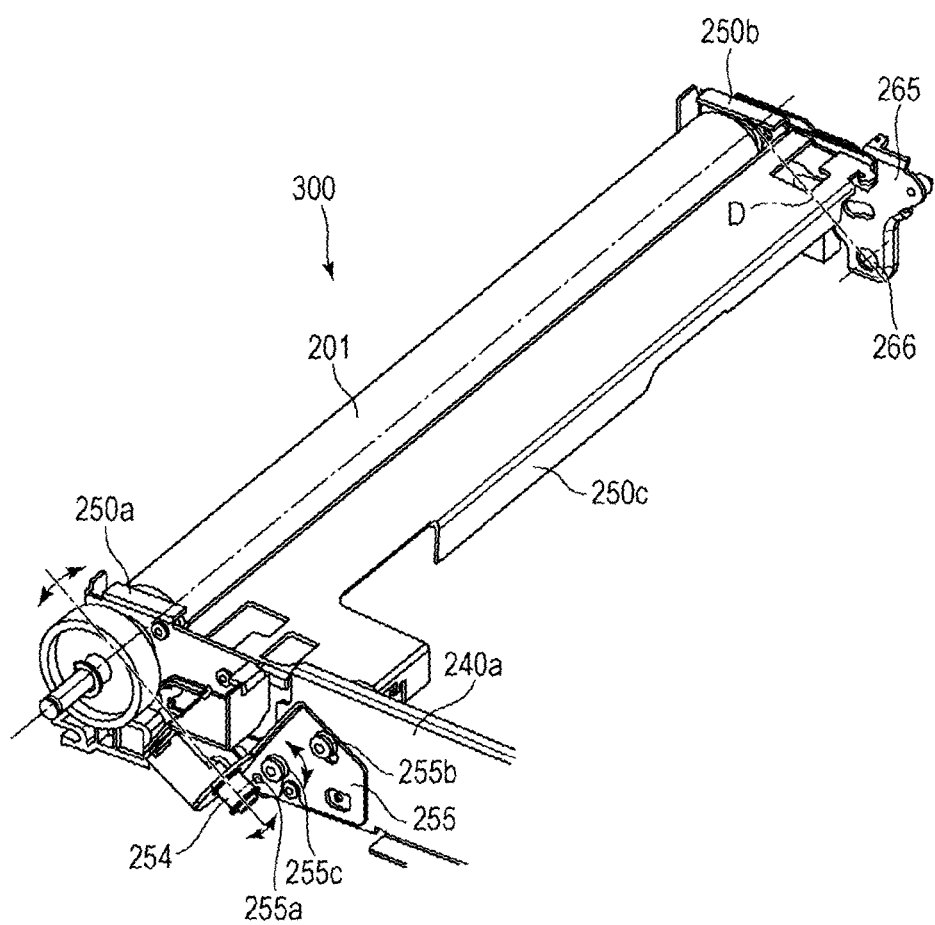
FIG. 17 is a perspective view of the steering mechanism showing the way in which an inclination center position of the steering mechanism is adjusted.

FIG. 17 is a perspective view of the steering mechanism 300, illustrating the way in which the position of the support plate 255 is adjusted. The inclining shaft 254 of the second frame 250 can be inclined by pivoting the support plate 255 as to the front-side side plate 240a of the first frame 240, as illustrated in FIG. 17. This means adjusting, with respect to the steering control range that is decided by the inclinable range of the steering roller 201, the home position (the position where the steering roller 201 assumes a generally parallel attitude as to the other suspending rollers) of the eccentric cam 264, that is the reference thereof. Factors involved in belt deviation occurring are not restricted to misalignment of suspending rollers, and also include outer diameter precision of the suspending rollers, variance in the thickness of the intermediate transfer belt 106, difference in tension of the intermediate transfer belt 106 in the width direction, balance of pressure between the primary transfer portions and secondary transfer portion, and so forth. Accordingly, even if the intermediate transfer unit 200 is assembled so that the suspending rollers are generally parallel to each other, the intermediate transfer belt 106 may have a movement speed in one direction in the width direction, when rotating the intermediate transfer belt 106. Steering control to correct the positional deviation of the intermediate transfer belt 106 in the width direction due to belt deviation involves inclining the steering roller 201 to cancel out this movement speed of the intermediate transfer belt 106 in the width direction. However, the movement speed of the intermediate transfer belt 106 in the width direction is preferably near zero at the home position of the eccentric cam 264 where the initial state is decided (control input zero). Accordingly, the initial inclination amount of the steering roller 201 can be adjusted by the angular position of the support plate 255 in the rotational direction, so as to cancel out the deviation tendency of the intermediate transfer belt 106 in the initial state where the eccentric cam 264 is at the home position in the present embodiment.

Note that the reason why the axial line of the pivot center hole 255a of the support plate 255 is set to pass through the axial line of the inclining shaft 254 is so that the attitude of the inclining shaft 254 will be symmetrical in the positive and negative adjustment directions. The axial line of the pivot center hole 255a of the support plate 255 and the axial line of the arm pivot shaft 266 of the steering arm 265 also are preferably the generally same axial line. Accordingly, the inclination path of the front-side end of the rotation shaft 201a of the steering roller 201 due to adjusting of the rotational direction position of the support plate 255 can be made to generally match the inclination path of the back-side end of the rotation shaft 201a of the steering roller 201 due to the steering arm 265. In addition, the adjustment angle of the inclining shaft 254 can be made to generally match the pivot angle (steering control amount) of the steering arm 265. Specifically, when the rotational angle of the steering arm 265 necessary to cancel out the movement speed of the intermediate transfer belt 106 in the width direction with the eccentric cam 264 at the home position (control input zero) is φ, the adjustment angle of the support plate 255 can be set to −φ. According to this adjustment, the movement speed of the intermediate transfer belt 106 in the width direction under control input zero can be made to be generally zero.

6. Advantages

As described above, one end of the steering arm 265 is abutted against the eccentric cam 264 rotated by the steering motor 261 in the present embodiment, while the back-side end of the rotation shaft 201a of the steering roller 201 is supported by the other end. Accordingly, fitting looseness and wear at the slide portion that can occur in configurations where the frame supporting the steering roller is moved along the edge of another frame, and deterioration of attitude of the steering roller due to inclination or the like of the frame supporting the steering roller, do not occur. Accordingly, the present embodiment can suppress positional deviation of the steering roller 201 and reduce misalignment of the steering roller 201 as to the other suspending rollers. Thus, according to the present embodiment, inclination of the steering roller 201 along a predetermined inclination path that has been set, can be facilitated.

Also, the inclining shaft 254 that extends in a direction generally orthogonal to the rotation axis of the steering roller 201 is provided to the second frame 250 that supports the front-side end of the rotation shaft 201a of the steering roller 201, and the inclining shaft 254 is the center of inclination of the steering roller 201 in the present embodiment. Accordingly, there is substantially no twisting of the support member of the steering roller 201 at the time of inclining the steering roller 201, which can occur in a configuration where the end of the rotation shaft at the inclination center side of the steering roller is supported by a fixed arm. Thus, according to the present embodiment, the center of inclination of the steering roller 201 can be provided at a desired position, and even more precise belt position control can be performed. Further, according to the present embodiment, the inclination attitude of the steering roller 201 can be restricted so as to be generally symmetrical in the inclination directions, and thus can be stipulated to a desired inclination attitude.

In this way, the present embodiment facilitates setting the center of inclination of the steering roller 201 to a predetermined position. Also, there is substantially no twisting of the support member of the steering roller according to this configuration, so the load necessary to incline the steering roller 201 can be reduced.

Thus, according to the present embodiment, twisting of the support member due to the actions of inclining the steering roller 201 can be suppressed, and the inclination attitude of the steering roller 201 as to other suspending rollers can be maintained at the desired inclination attitude.

Also, according to the present embodiment, enabling the position of the inclining shaft 254 to be adjusted enables movement of the intermediate transfer belt 106 in the width direction to be suppressed in an initial state where steering control is not performed. Thus, the controllable width regarding positional deviation of the intermediate transfer belt 106 in the width direction can be uniformly allocated. As a result, the initial attitude of the steering roller 201 and the attitude when inclined can be suitably maintained for performing active steering control where positional deviation of the intermediate transfer belt 106 in the width direction is corrected.

Also, the belt driving motor 270 is provided to the second frame 250 at the opposite side of the inclining shaft 254 from the suspending portion where the steering roller 201 suspends the intermediate transfer belt 106, so moment of inertia around the inclining shaft 254 due to inclination can be reduced. Also, the belt driving motor 270 is fixed to the second frame 250 and the steering motor 261 is fixed to the first frame, so the intermediate transfer unit 200 can be integrally exchanged without mechanical mounting/unmounting at an apparatus main unit 110 side.

Others

The present invention has been described above by way of a specific embodiment, but the present embodiment is not restricted to the above-described embodiment.

While the number of image forming units has been described as being four in the above embodiment, this is not restrictive, and the number may be larger or smaller. The order of array of the image forming units for the respective colors is not restricted to that in the above-described embodiment.

Although the intermediate transfer belt is suspended by five suspending rollers in the above-described embodiment, the number of suspending rollers suspending the intermediate transfer belt is not restricted to this, and the number may be larger or smaller.

Also, although the first pivot shaft (inclination shaft) was described in the above embodiment as being provided to the first support member (second frame) side and the bearing member provided on the first frame side, this relationship may be in reverse. That is to say, an arrangement may be made where the first pivot shaft (inclination shaft) is provided to the first frame side and the bearing member provided on the first support member (second frame) side. It is sufficient for the first pivot shaft to be attached to one of the first support member and the first frame, and the bearing member that pivotably supports the first pivot shaft to be attached to the other. In the same way, although the second pivot shaft (arm pivot shaft) was described as being provided to the first frame side and the bearing member thereof (bearing hole) provided on the steering arm side, this relationship may be in reverse. That is to say, an arrangement may be made where the second pivot shaft (arm pivot shaft) is provided to the steering arm side, and the bearing portion (bearing hole) provided to the first frame side. It is sufficient for the second pivot shaft to be attached to one of the second support member and the first frame, and the bearing portion that pivotably supports the second pivot shaft to be attached to the other.

Also, although the bearing member for supporting the first pivot shaft (inclination shaft) was described in the above embodiment as being pivotable to adjust the inclination of the first pivot shaft (inclination shaft), this relationship may be in reverse. For example, in a case where the first pivot shaft (inclination shaft) is attached to the first support member (second frame), the attaching portion may be made to be pivotable, so as to enable adjustment of the inclination of the first pivot shaft.

Figure 18:
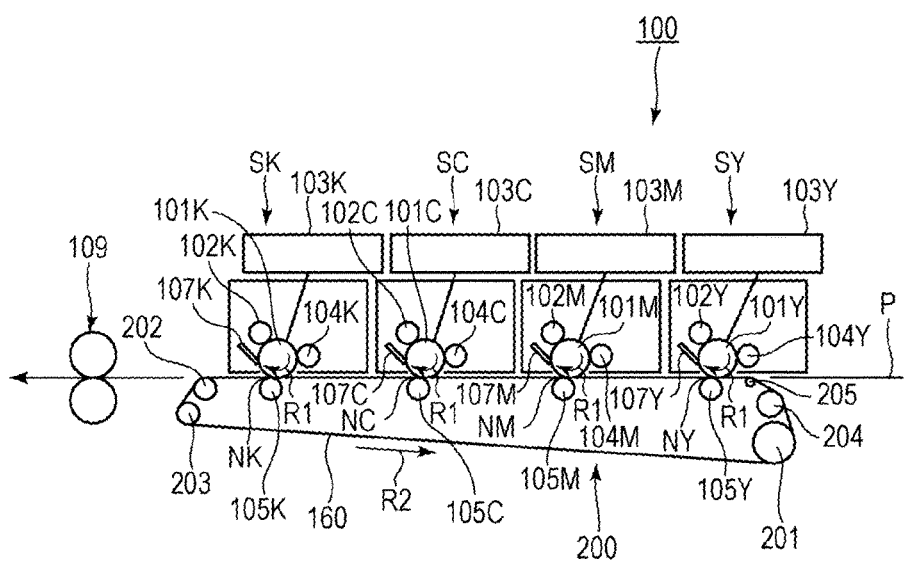
FIG. 18 is a schematic cross-sectional view illustrating principal portions of another example of the image forming apparatus.

Also, although description has been made in the above embodiment by way of an example of an intermediate transfer type image forming apparatus, the present invention can be applied to direct transfer image forming apparatuses as well. FIG. 18 is a schematic cross-sectional diagram of principal portions of a direct transfer image forming apparatus. Components that have the same or corresponding functions and configurations as those in the image forming apparatus in FIG. 1 are denoted by the same reference symbols. The image forming apparatus 100 in FIG. 18 has a recording material bearing belt 160 configured of an endless belt serving as a recording material bearing member, instead of the intermediate transfer belt 106 in the image forming apparatus 100 in FIG. 1. Toner images formed on the photosensitive drums 101 at the image forming units S in the image forming apparatus 100 in FIG. 18 are transferred at the respective transfer portions N onto the recording material P, conveyed by being borne on the recording material bearing belt 160. There are cases where a steering mechanism is provided with such a direct transfer image forming apparatus 100, in order to correct positional deviation of the recording material bearing belt 160 in the width direction due to belt deviation. Accordingly, the present invention can also be applied to direct transfer image forming apparatuses, and advantages the same as those of the embodiment described above can be obtained. Further, the present invention is also applicable to belt conveyance devices and image forming apparatuses or the like having the same where the belt is a photosensitive belt or an electrostatic printing dielectric belt.

According to the present invention, setting of a center of inclination of a steering roller to a predetermined position, and inclining the steering roller following a set predetermined inclination path, is facilitated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A belt conveyance device, comprising:
an endless belt;
a supporting roller configured to support the belt;
a steering roller configured to support the belt and configured to be inclinable with respect to the supporting roller to move the belt in a width direction;
a frame configured to rotatably support the supporting roller, the frame including a first side frame that rotatably supports a first end portion of the supporting roller and a second side frame that rotatably supports a second end portion of the supporting roller;

a first support portion configured to rotatably support a first end portion of the steering roller, the first support portion being rotatable about a first axial line substantially parallel to a rotational axis line of the supporting roller;

a second support portion configured to rotatably support a second end portion of the steering roller;

a detecting unit configured to detect a position of the belt in the width direction;

a steering drive unit configured to move the first support portion;

a controller configured to control the steering drive unit on the basis of a detection result of the detecting unit;

a pivot shaft attached to either one of the second support portion and the second side frame and rotatably supported around a second axial line intersecting with a rotational axis line of the steering roller; and a bearing attached to the other one of the second support portion and the second side frame and rotatably supporting the pivot shaft.

2. The belt conveyance device according to claim 1, wherein the second axial line and the rotational axis line of the steering roller are substantially orthogonal.

3. The belt conveyance device according to claim 1, wherein, when the steering roller is substantially parallel to the supporting roller, the second axial line is substantially parallel to a line segment connecting a rotational center of the steering roller and a rotational center of a first support portion.

4. The belt conveyance device according to claim 1, wherein the second axial line passes through the steering roller.

5. The belt conveyance device according to claim 1, wherein the first axial line passes through the second axial line.

6. The belt conveyance device according to claim 1, wherein, when the rotation axis of the steering roller and the rotation axis of the supporting roller are substantially parallel, a straight line, which is substantially orthogonal to the first axial line and the rotation axis of the steering roller, is substantially parallel to the second axial line.

7. The belt conveyance device according to claim 1, further comprising an adjustment mechanism for adjusting a position of the pivot shaft or the bearing, wherein the adjustment mechanism adjusts the pivot shaft or the bearing so as to rotate around a third axial line parallel to the first axial line.

8. The belt conveyance device according to claim 7, wherein the pivot shaft is attached to the second support portion and the bearing is attached to the second side frame, and the adjustment mechanism adjusts the position of the bearing.

9. The belt conveyance device according to claim 8, wherein the third axial line passes through the second axial line and is substantially orthogonal to the second axial line.

10. The belt conveyance device according to claim 9, wherein the third axial line and the first axial line are substantially the same axial line.

11. The belt conveyance device according to claim 1, wherein the frame is a first frame, and the belt conveyance device further comprises:

a drive source that rotationally drives the steering roller; and a second frame being movable with the steering roller including:

the second support portion, a third support portion configured to rotatably support the one end portion of the steering roller, and a connecting portion configured to connect the second support portion and the third support portion, wherein the driving source is attached to the second frame.

12. The belt conveyance device according to claim 1, wherein the steering drive unit is attached to the frame.

13. An image forming apparatus, comprising:

a belt conveyance device having an endless belt; and a toner image forming unit configured to form a toner image on the belt, wherein the belt conveyance device includes:

a supporting roller configured to support the belt;

a steering roller configured to support the belt and configured to be inclinable with respect to the supporting roller to move the belt in a width direction;

a frame configured to rotatably support the supporting roller, the frame including a first side frame that rotatably supports a first end portion of the supporting roller and a second side frame that rotatably supports a second end portion of the supporting roller;

a first support portion configured to rotatably support a first end portion of the steering roller, the first support portion being rotatable about a first axial line substantially parallel to a rotational axis line of the supporting roller;

a second support portion configured to rotatably support a second end portion of the steering roller;

a detecting unit configured to detect a position of the belt in the width direction;

a steering drive unit configured to move the first support portion;

a controller configured to control the steering drive unit on the basis of a detection result of the detecting unit;

a pivot shaft attached to either one of the second support portion and the second side frame and rotatably supported around a second axial line intersecting with a rotational axis line of the steering roller; and a bearing attached to the other one of the second support portion and the second side frame and rotatably supporting the pivot shaft.

* * * * *